(12) United States Patent
Singal et al.

(10) Patent No.: US 10,810,266 B2
(45) Date of Patent: Oct. 20, 2020

(54) DOCUMENT SEARCH USING GRAMMATICAL UNITS

(71) Applicant: Adobe Inc., San Jose, CA (US)

(72) Inventors: Dhruv Singal, Bangalore (IN); Ravi Teja Ailavarapu Venkata, Mumbai (IN); Tirth Patel, Vadodara (IN); Arghya Mukherjee, Kolkata (IN); Anandhavelu Natarajan, Bangalore (IN)

(73) Assignee: ADOBE INC., San Jose, CA (US)

( * ) Notice: Subject to any disclaimer, the term of this patent is extended or adjusted under 35 U.S.C. 154(b) by 399 days.

(21) Appl. No.: 15/816,926

(22) Filed: Nov. 17, 2017

(65) Prior Publication Data
US 2019/0155913 A1    May 23, 2019

(51) Int. Cl.
| | | |
|---|---|---|
| G06F 17/00 | (2019.01) | |
| G06F 16/93 | (2019.01) | |
| G06F 40/30 | (2020.01) | |
| G06F 40/216 | (2020.01) | |
| G06F 40/284 | (2020.01) | |
| G06F 40/289 | (2020.01) | |
| G06F 16/33 | (2019.01) | |
| G06F 16/338 | (2019.01) | |
| G10L 15/26 | (2006.01) | |

(52) U.S. Cl.
CPC .......... *G06F 16/93* (2019.01); *G06F 16/338* (2019.01); *G06F 16/3344* (2019.01); *G06F 40/216* (2020.01); *G06F 40/284* (2020.01); *G06F 40/289* (2020.01); *G06F 40/30* (2020.01); *G10L 15/26* (2013.01)

(58) Field of Classification Search
None
See application file for complete search history.

(56) References Cited

U.S. PATENT DOCUMENTS

| | | | |
|---|---|---|---|
| 2004/0221235 A1* | 11/2004 | Marchisio | G06F 40/211 715/261 |
| 2015/0052115 A1* | 2/2015 | Sharifi | G06F 16/685 707/722 |
| 2016/0239557 A1* | 8/2016 | Glover | G06F 16/3344 |
| 2017/0293685 A1* | 10/2017 | Miller | G06F 16/325 |

OTHER PUBLICATIONS

Google news dataset for Word2Vec: https://github.com/mmihaltz/word2vec-GoogleNews-vectors, retrieved on Nov. 17, 2017, 1 page.
Google Speech API: https://cloud.google.com/speech/, retrieved on Nov. 17, 2017, 6 pages.

(Continued)

*Primary Examiner* — Anhtai V Tran

(57) ABSTRACT

Systems and techniques for searching within a document include receiving a query by way of a user interface of an application, and in conjunction with identification of the at least one document. A feature value characterizing a relevance of each grammatical unit of the document to the query may be extracted. The grammatical units may be ranked, based on each feature value of each grammatical unit. At least one selected grammatical unit of the plurality of grammatical units may then be displayed, based on the ranking.

18 Claims, 4 Drawing Sheets

(56) References Cited

OTHER PUBLICATIONS

Stanford CoreNLP: https://stanfordnlp.github.io/CoreNLP/, retrieved on Nov. 17, 2017, 4 pages.
WebAP dataset: https://ciir.cs.umass.edu/downloads/WebAP/, retrieved on Nov. 17, 2017, 3 pages.
Friedman, Jerome H., "Stochastic gradient boosting." retrieved from http://statweb.stanford.edu/~jhf/ftp/stobst.pdf, Mar. 26, 1999, 10 pages.
Krovetz, Robert , "Viewing morphology as an inference process." Proceedings of the 16th annual international ACM SIGIR conference on Research and development in information retrieval. ACM, 1993, 12 pages.
Manning, Christopher D., et al., "An Introduction to Information Retrieval", Cambridge University Press, 2009, p. 241.
Mikolov, Tomas , et al., "Efficient estimation of word representations in vector space." arXiv preprint arXiv:1301.3781 (2013), pp. 1-12.

* cited by examiner

US 10,810,266 B2

DOCUMENT SEARCH USING GRAMMATICAL UNITS

TECHNICAL FIELD

This description relates to computer-based searching within digital documents.

BACKGROUND

Computers, and associated data stores, are capable of providing access to large numbers of potentially lengthy documents and other content. Given such potentially large quantities of information, it becomes difficult, inefficient, time-consuming, or impossible for users to find desired information within an available timeframe.

Some search techniques rely on matching strings of characters, such as letters within a word. For example, a user might enter a search for a particular word within a document by typing the desired word, whereupon a search engine or system may execute a search for the entered word. In practice, this approach is prone to both false positives and false negatives. For example, searching for a common word may return a large number of results, many of which will not be of interest. On the other hand, such a search may return an empty result set even from a relevant document or document portion, simply because the exact character string was not found (such as when the searched document uses a synonym of the searched-for word, rather than the word itself).

Further, techniques that are useful when searching for documents from among many documents (such as a web-based search for online documents) may not be useful or relevant when searching within an individual document(s). For example, some web-based searches rely on examinations of hyperlinks to documents from within linked documents, in order to obtain desired search results, which is not likely to be sufficiently helpful for searching within one or more known documents.

SUMMARY

According to one general aspect, systems and techniques are described for searching within at least one document, including receiving a query, by way of a user interface of an application, in conjunction with identification of the at least one document, the at least one document stored using a computer memory, and identifying a plurality of grammatical units within the at least one document. The systems and techniques may include extracting a value for at least one feature for each grammatical unit with respect to the query, the at least one feature value characterizing a relevance of each grammatical unit to the query, ranking the grammatical units, based on each feature value of each grammatical unit, and displaying, by way of the user interface and in conjunction with the at least one document, at least one selected grammatical unit of the plurality of grammatical units, based on the ranking.

According to another general aspect, systems and techniques are described for receiving a query with respect to at least one document, identifying sentences within the at least one document, and extracting a plurality of features characterizing a relevance of each sentence of the sentences to the query. The sentences may be ranked based on the features, and the sentences may be visually designated within the document, in an order corresponding to the ranking.

The details of one or more implementations are set forth in the accompanying drawings and the description below. Other features will be apparent from the description and drawings, and from the claims.

DETAILED DESCRIPTION

Figure 1:
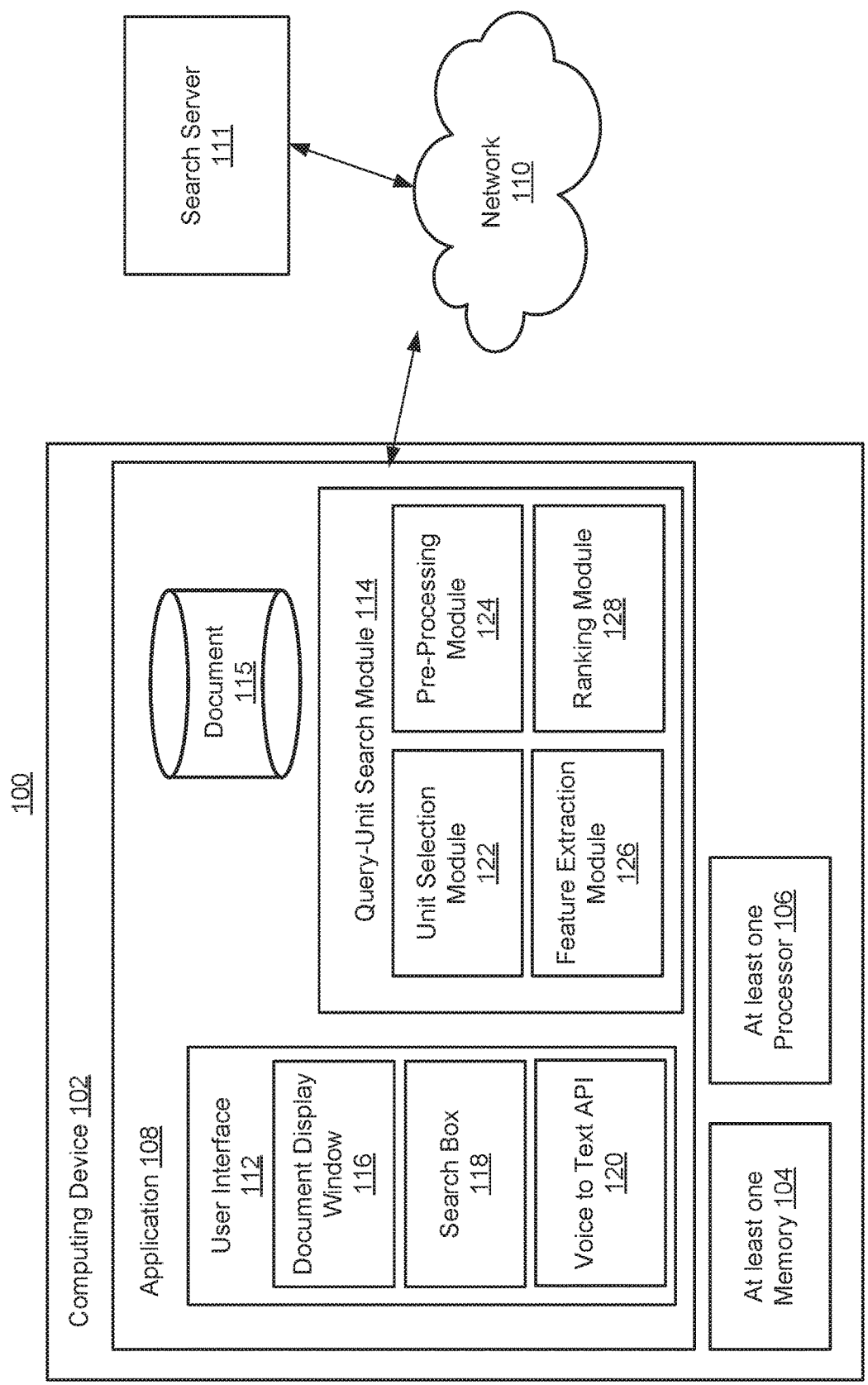
FIG. 1 is a block diagram of a system for document searching using grammatical units.

This document describes systems and techniques that provide for automated searching within a document or set of documents. Such systems and techniques overcome technical challenges of previous systems and techniques, and improve the process(es) to perform such automated processing. For example, from within an application, a query may be submitted and a search may be performed with respect to the content of grammatical units (such as a phrase, clause, or sentence) within an identified document(s), instead of performing string-based matching of document terms and query terms. The grammatical unit-based (also referred to as unit-based) document searching module used by the application is a more efficient, faster, more accurate algorithm(s) than other algorithms that depend on string matching, or other known search techniques. Moreover, the unit-based document searching module provides for the new computer functionality of, e.g., requesting and finding, phrases, clauses, or sentences, even when the phrases, clauses, or sentences do not contain the exact term(s) used in the query, and for returning search results based on a ranked relevance of each specified type of grammatical unit with respect to each query.

The systems and techniques provide a user interface within the application to enable users to submit a query, including a query that specifies the type of grammatical unit desired in conjunction with the query term(s). The user interface displays search results by, e.g., displaying each grammatical unit within the search results, either separately from, and/or highlighted or identified within, the searched document(s).

Further, because the grammatical units are ranked with respect to the query, users can navigate the search results based on order of ranking (e.g., relevance), rather than simply reviewing the search results in their order of appearance within the document. In this way, the user is more likely to find a desired search result in a fast and efficient manner.

When used with a single document or sufficiently small set of documents, the described techniques can identify and examine all requested grammatical units with respect to the submitted query. For example, for a sentence-based search of a document, it is feasible to identify all sentences within the document, and process the query term(s) and each sentence to obtain features of each sentence with respect to the query (e.g., such as semantic or contextual features). For example, a query-sentence pair can be formed for each sentence, relative to a specific query.

Each sentence or other specified grammatical unit may then be ranked using one or more machine learning techniques. For example, a model may be trained on the feature set used to obtain the types of features just referenced, so that the sentences may be ranked accordingly. Then, the highest-ranked sentence(s) may be returned as search results, using the user interface specified above.

The systems and techniques described in this document are capable of integrating all of the tasks for the search application using the seamless user interface and unit-based search module. Advantageously, the systems and techniques described in this document help to avoid false positives such as search results that simply include string-matched query terms, even when those terms have different semantic or contextual meanings within the searched document. Similarly, false negative results are minimized or avoided, e.g., because the described techniques can provide sentences that are relevant to the query, even when the sentences do not include any of the exact terms of the query.

Additionally, the systems and techniques described herein advantageously improve existing technology areas. For example, as described, computer-based document searching is improved. Further, the systems and techniques may be used for a more automated and more efficient and faster approach when applied to voice recognition technology and voice-assisted searching. For example, a user may submit queries by voice, i.e., spoken queries, and will be more likely to obtain desirable results than in conventional voice-based search techniques.

FIG. 1 is a block diagram of a system 100 for document searching using grammatical units. The system 100 includes a computing device 102 having at least one memory 104, at least one processor 106 and at least one application 108. The computing device 102 may communicate with one or more other computing devices over a network 110. For instance, the computing device 102 may communicate with a search server 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network. In many of the following examples, the computing device 102 is described as a mobile device.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102, at the computing device 102. In other implementations, the application 108 may be running on the computing device 102 as a component of a cloud network where a user accesses the application 108 from another computing device over a network, such as the network 110. In one implementation, the application 108 may be a document creation or viewer application. The application 108 may be a standalone application that runs on the computing device 102. Alternatively, the application 108 may be an application that runs in another application such as a browser application, perhaps in conjunction with the search server 111.

In FIG. 1, the application 108 is illustrated as including a user interface 112. As referenced above, the application 108 may represent a document reader application, and the user interface 112 may represent a corresponding user interface. As also referenced above, the application 108 may include a browser application, so that the user interface 112 represents at least a portion of a browser window. In various ones of the following examples provided with respect to FIG. 1, the application 108 may be implemented as a mobile application when the computing device 102 represents a mobile device. For example, the application 108 may be an Android application operating on a mobile device using the Android operating system.

Further in FIG. 1, the application 108 is illustrated as including a query-unit search module 114. As referenced above, and described in detail below, the query-unit search module 114 is configured to search within one or more documents, represented by the document 115, in conjunction with the user interface 112. In this context, the term "grammatical unit," or simply "unit" should be understood to refer to, for example, any combination of words within the document 115 that are expressed together in the context of one or more sentences, in order to convey information within the context of the document 115. For example, such a grammatical unit may include a sentence, but may also include a phrase, a clause, a paragraph, a section or subsection, or any other cohesive word unit within the document 115. As described in detail herein, by virtue of searching, ranking, and providing search results within the document 115 in terms of desired types of grammatical units, the query-unit search module 114 advantageously provides desirable search results from within the document 115 in a fast and efficient manner.

In more detail, the user interface 112 is illustrated as including a document display window 116 that may be configured to render and otherwise display the document 115. The user interface 112 is also illustrated as including a search box 118, which may be utilized by a user of the system 100 to enter one or more queries and associated query terms or search terms, to be utilized by the query-unit search module 114 in searching the document 115. Finally with respect to the user interface 112, a voice-to-text application program interface (API) 120 is illustrated, which may be configured to enable receipt of voice-based queries within the search box 118, for conversion thereof into query text.

Specific examples of the document display window 116 and the search box 118 are illustrated and described below, e.g., with respect to FIG. 2. In general, however, it will be appreciated that the search box 118 may be implemented using a popup window, a separate portion of the user interface 112, a purely-voice based interface (such as when a query is spoken by the user but not necessarily rendered as text within the user interface 112), or any other conventional, suitable, or future technique for receiving queries.

In the example of FIG. 1, the voice-to-text API 120 is illustrated in conjunction with the user interface 112. However, it will be appreciated that the voice-to-text API 120 may be implemented as part of the query-unit search module 114. In additional or alternative implementations, the voice to text API 120 may leverage, utilize, or otherwise interact with a voice-to-text conversion engine, not explicitly illustrated in the example of FIG. 1, which may be implemented in either or both of the computing device 102 and/or the search server 111, or in a different server. Similarly, all or part of the query-unit search module 114 may be implemented at the search server 111, as well.

In many of the examples described herein, the document 115 of FIG. 1 may be illustrated and described as a single document. However, it will be appreciated that, in various implementations, the document 115 may represent two or more documents. For example, the query-unit search module 114 may be utilized to search a group of documents that are all related to a particular topic of interest to the user of the system 100.

In practice, a user wishing to utilize the system 100 may initially load the document 115 within the document display window 116 of the user interface 112. In conjunction with activating the search box 118, the user may submit a query, including one or more query terms, and using the voice-to-text API 120 and/or other suitable input modalities.

In various examples, the user may specify the type of grammatical unit desired. For example, as described and illustrated below with respect to FIG. 2, the user may submit a query by requesting all phrases with a particular keyword, or all sentences with that keyword. If the user simply enters a keyword without specifying a type of grammatical unit, then a default grammatical unit (such as the sentence) may be selected. For example, the user may configure the query-unit search module 114 with respect to a default grammatical unit to be used.

Thus, a unit selection module 122 of the query-unit search module 114 may be configured to receive the query via the search box 118, and determine the type or nature of the grammatical unit desired. For example, as just explained, the unit selection module 122 may identify a specified type of grammatical unit from within the submitted query, or may consult appropriate configuration data to determine a default grammatical unit to be used.

The query and the document 115 may then be submitted to a preprocessing module 124. Example operations of the preprocessing module 124 are provided in more detail below, e.g., with respect to FIG. 4. In general, however, it will be appreciated that the preprocessing module 124 is configured to standardize, normalize, and otherwise prepare the query and the document 115 for subsequent examination and processing within the query-unit search module 114. By way of non-limiting example, the preprocessing module 124 may remove common words (e.g., such as "the," "to," "and," and so on), or reduce words to their base forms (e.g., by removing modified word endings, such as "ing," or "ed"). In practice, the preprocessing module 124 may process the document 115 prior to the query being received, or in conjunction therewith. For example, a single document 115 may be subject to preprocessing, and then searched using a plurality of queries received over a period of time.

A feature extraction module 126 of the query-unit search module 114 is configured to receive the pre-processed query and the pre-processed document, and thereafter calculate one or more features for each specified grammatical unit (e.g., sentence) within the document, and with respect to the received query. Specific example features, and associated operations for extracting the features, are described in more detail below, with respect to FIG. 4. In general, with respect to FIG. 1, it will be appreciated that such features may include a language model score, in which a language model is constructed for each sentence or other specified grammatical unit within the document 115, as well as for the query itself.

For example, in examples in which the grammatical unit being searched is a sentence, the feature extraction module 126 may determine a number of relevant characteristics or aspects of the sentences of the document 115, and of the received query. For example, the feature extraction module 126 may determine a number of times that a given word occurs within the query, or within each sentence. The feature extraction module 126 may consider a length of each sentence of the document 115, or a probability that a specific word included in the received query occurs within the document 115. These and other parameters may be utilized to calculate the likelihood of each sentence being relevant to the received query.

The feature extraction module 126 may also calculate a semantic similarity between the received query and each sentence of the document 115, using techniques described below, or other suitable techniques. In additional or alternative examples, the feature extraction module 126 may also be configured to calculate contextual or context features that are specific to the context of each sentence. For example, the feature extraction module 126 may consider a preceding sentence and a subsequent sentence with respect to each sentence being considered.

Finally with respect to the query-unit search module 114, a ranking module 128 is illustrated and may be configured to rank the sentences, or other grammatical units selected in conjunction with the received query, using a sentence ranking model. For example, the features used by the feature extraction module 126 may be used to form a feature set that is used to train the ranking model of the ranking module 128, e.g., may be used to optimize weights or other parameters of the sentence ranking model.

Figure 2:
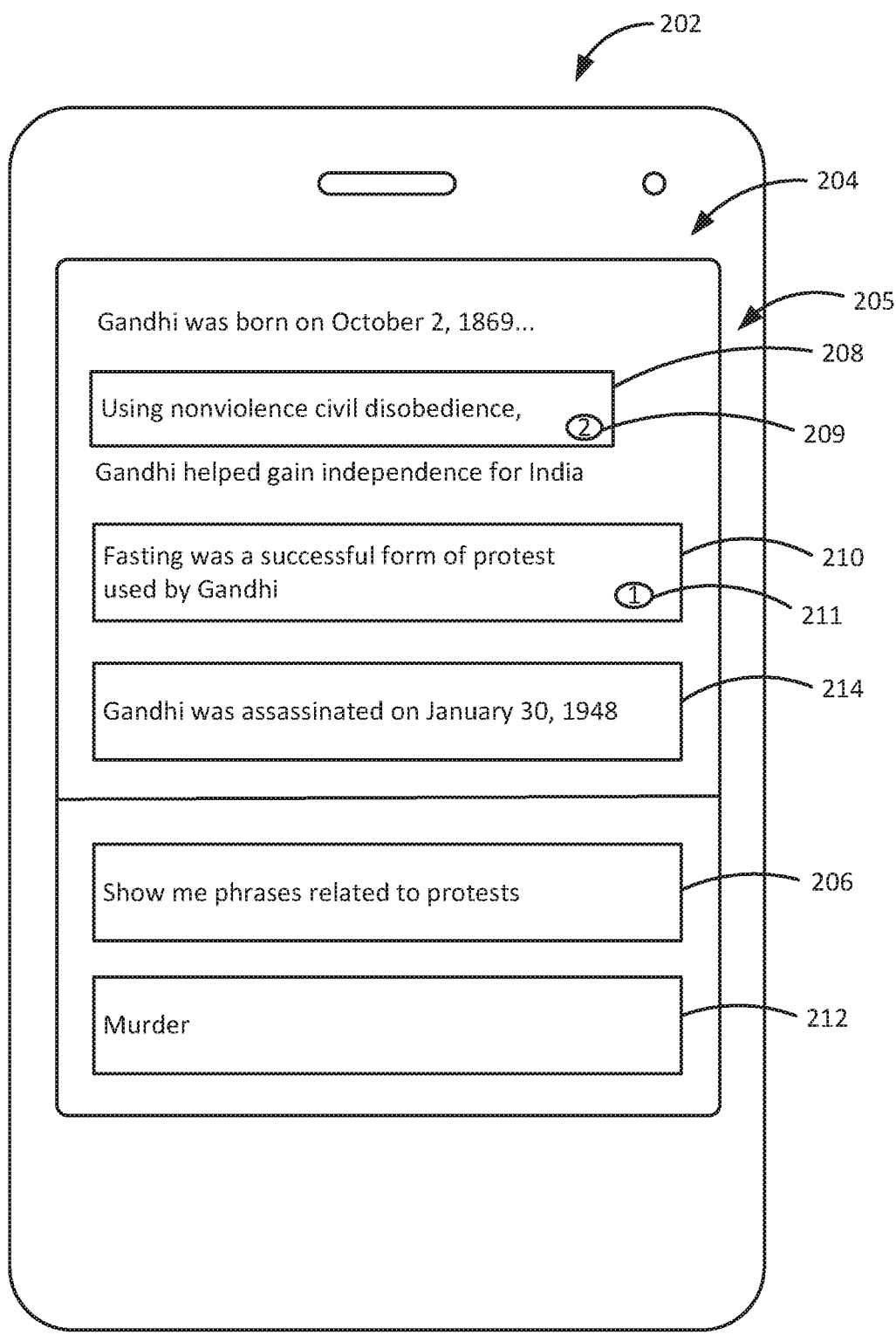
FIG. 2 is an example screen shot illustrating a user interface of an application for document searching using grammatical units, using the system of FIG. 1.

FIG. 2 is an example screenshot illustrating a user interface of an application for document searching using grammatical units, using the system of FIG. 1. In the example of FIG. 1, a mobile device 202 represents the computing device 102 of FIG. 1. Within the mobile device 202, a user interface 204 corresponds generally to the user interface 112 of FIG. 1, while a document display window 205 corresponds to the document display window 116 of FIG. 1.

Within the user interface 204, example content excerpts of a document corresponding to the document 115 are illustrated. In order to search all of the content of the corresponding document, a search box 206 is illustrated that corresponds to the search box 118 of FIG. 1.

As shown within the search box 206, the user may enter a query, which may specify both a type of grammatical unit desired, as well as query terms specifying the content of the particular query. In the example, the search box 206 includes the content, "show me phrases related to protest." As described, the content of the search box 206 may be obtained using the voice-to-text API 120 of FIG. 1, or may be entered by the user by way of an associated keyboard, or using any other suitable text entry technique.

In the example, as the document being searched includes biographical information describing the life of Mahatma Gandhi. The query-unit search module 114 may proceed to execute the various techniques described above with respect to FIG. 1, in order to identify and rank phrases related to the term protest that are included within the document content.

For example, as shown, the query-unit search module 114 may identify the phrase "using nonviolent civil disobedience," 208 as a phrase related to the concept of protest. Similarly, the query-unit search module 114 may identify the sentence 210 that states "fasting was a successful form of protest used by Gandhi."

In the example of the phrase 208, the query-unit search module 114 may identify the phrase "using nonviolent civil disobedience," as a phrase, based on its placement at the beginning of a sentence, and by virtue of the inclusion of the "," in the sentence. In the example of the sentence 210, it may occur that the query-unit search module 114 does not detect a separate phrase related to protest within the sentence 210, and therefore returns or identifies the sentence 210 in its entirety.

More generally, it will be appreciated from the above description that grammatical units are typically arranged in a hierarchical fashion, so that, for example, phrases, clauses, sentences, and paragraphs form part of such a hierarchy. Consequently, the query-unit search module 114 may be configured to return one or more levels higher within the hierarchy when unable to conclusively identify a specified or requested level of the hierarchy. For example, if a document includes a number of phrases that do not form complete sentences, but that are grouped together in a paragraph form, the query-unit search module 114 may return or identify the entire paragraph within search results.

Of course, it will be appreciated that the query-unit search module 114 may be configured in any desired manner with respect to the above types of parameters and operations. For example, both a designer and/or user of the query-unit search module 114 may be provided with an ability to set such configuration parameters.

Further in the example of FIG. 2, a separate search box 212 is illustrated as including the single word "murder." In the example, the query-unit search module 114 returns the sentence 214, which states "Gandhi was assassinated on Jan. 30, 1948." As will be appreciated, the sentence 214 does not include the string "murder," but may be returned as a search result based on the overall analysis of a relevance of the sentence 214 by the query-unit search module 114.

Although FIG. 2 illustrates the search box 212 separately from the search box 206, it will of course be appreciated that a single search box may be utilized to enter multiple queries. Nonetheless, the search boxes 206, 212 further illustrate that users may submit queries in a desired manner, e.g., as individual words, with or without specification of a desired type of grammatical unit to be included.

When returning or providing search results, the query-unit search module 114 may provide the most relevant (e.g., most highly-ranked) search results first, even if those search results occur sequentially within the search document at a later point than earlier-included, but less relevant, search results.

For example, returning to the examples of the search box 206, the query-unit search module 114 may return the two search results 208, 210, as described. As illustrated, the search result 208 occurs within the rendered document prior to the search result 210. Nonetheless, in response to receipt of the query included within the search box 206, the query-unit search module 114 may initially return the search result 210 as a first, most highly ranked search result. For example, the query-unit search module 114 may be configured to highlight, underline, bold, or otherwise designate the sentence 210 within the rendered document, and to display surrounding portions of the sentence 210 within the available screen space of the document display window 205.

If the user decides that the sentence 210 is not sufficiently satisfactory, and wishes to see additional search results, then the query-unit search module 114 may similarly provide a visual designation of the phrase 208, again within the context of surrounding portions of the rendered document, and in conjunction with removing any previous visual designation of the sentence 210. Consequently, in such example embodiments, the user is provided with most-relevant search results, singularly and in sequential order of ranking/relevance, and independently of placement of the search result within the content of the document being searched.

In other examples, the query-unit search module 114 may visually designate all search results within the document at the same time, along with an additional designation of ranking scores. For example, both the search results 208, 210 may be visually designated within the document display window 205, but the search result 210 may be identified as having a higher result ranking than the search result 208. For example, different visual designations may be used, or the search results may be enumerated to indicate relative ranking order. For example, in FIG. 2, the search result 210 is associated with a ranking identifier "1" 211 to indicate its ranking as a most-relevant search result, while the search result 208 is associated with a ranking identifier "2" 209 indicating its ranking as a second-most relevant search result.

In various other example implementations, the user may select and view the different search results in a number of possible manners. For example, the user may scroll through contents of the document within the document display window 116, using an associated scrollbar (not explicitly illustrated in the example of FIG. 2). In other examples, the query-unit search module 114 may initially display a most highly-ranked search result within the document display window 116. Then, upon some input received from the user, such as hitting the space bar, hitting the enter key, or selecting a "next" arrow, the query-unit search module 114 may proceed to display the next-most highly-ranked search result within the document display window 116 and surrounded by adjacent content portions. In other words, visually designating the search result may include successively displaying document portions and highlighting individual sentences included therein, in response to corresponding user inputs, and in the order of the ranking.

Thus, the visual designation of ranked search results may include a ranking identifier displayed adjacent to a corresponding, ranked grammatical unit. In other implementations, a visual designation of search results may include successively highlighting individual grammatical units within the at least one document, in response to corresponding user inputs, and in an order of the ranking of the ranked grammatical units.

Figure 3:
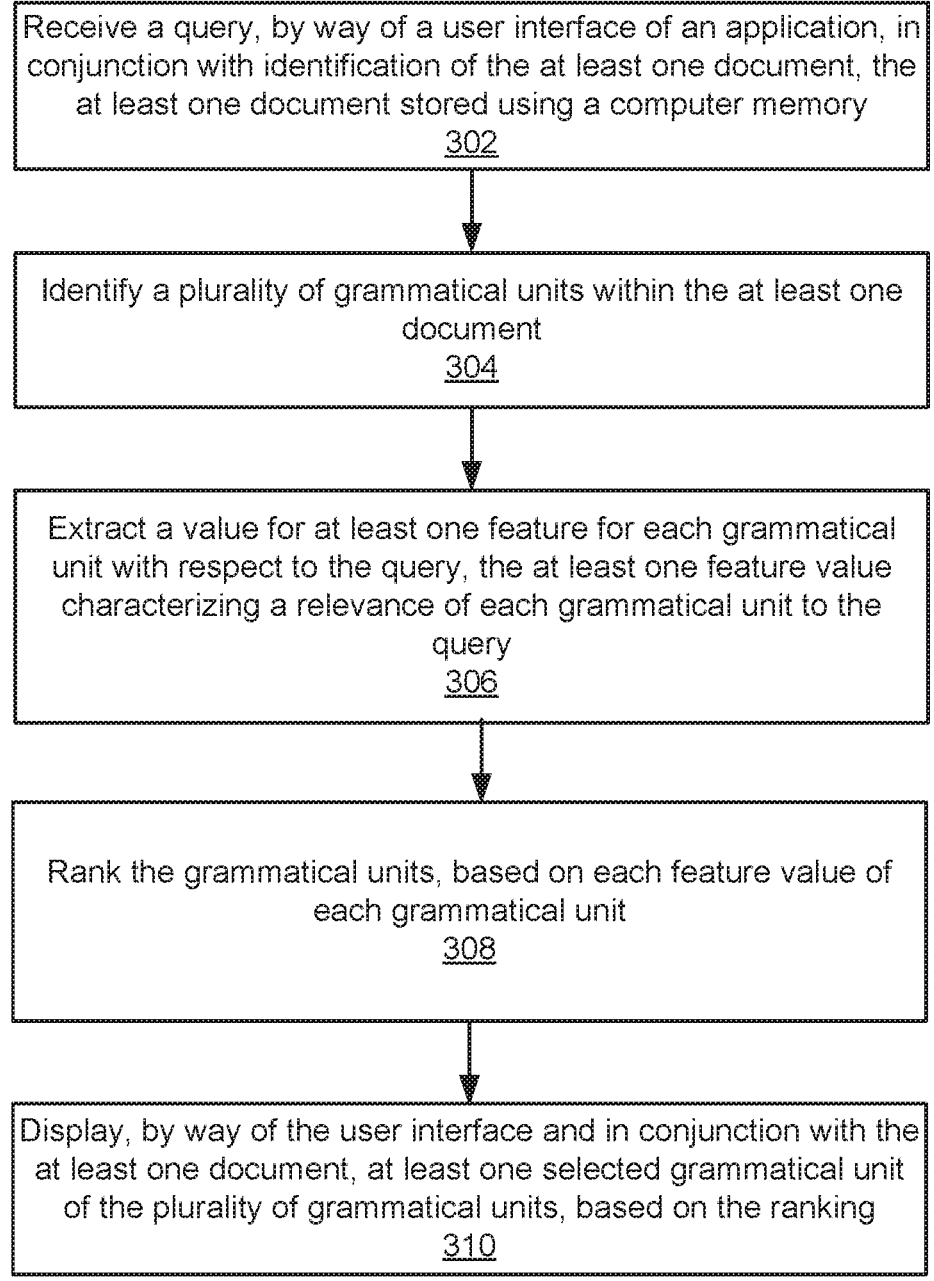
FIG. 3 is a flowchart illustrating example operations of the system of FIG. 1.

FIG. 3 is a flowchart 300 illustrating more detailed example operations of the system 100 of FIG. 1. In the example of FIG. 3, operations 302-310 are illustrated as separate, sequential operations. However, it will be appreciated that in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 3, a query is received, by way of a user interface of an application, in conjunction with identification of at least one document, the at least one document being stored using a computer memory (302). For example, the user interface 112, e.g., the document display window 116 and the search box 118, may be utilized to submit a query. The query may thus be received at the query-unit search module 114, e.g., at the unit selection module 122. In conjunction with receiving the query, the document 115 may be identified. For example, the document 115 may also be loaded into the user interface and viewed using the document display window 116. In other implementations, the document 115 may be stored in a separate or remote computer memory than that used by the user interface 112, and may be accessed therein by the query-unit search module 114. As also described, the user may utilize the voice to text API 120 to submit the query in conjunction with the search box 118.

A plurality of grammatical units may be identified within the at least one document (304). For example, the unit selection module 122 may identify a specified type of grammatical unit from within the received query, such as a phrase, clause, sentence, or paragraph. In other implementations, as described, the unit selection module 122 may not receive an identification of a specific grammatical unit type within the query, and may instead use a preconfigured default type of grammatical unit, such as the sentence. The preprocessing module 124 may be configured to analyze the document 115 and designate each of the specified type of grammatical units contained therein. For example, the pre-processing module 124 may identify individual sentences from within the document 115. Of course, the preprocessing module 124 also may be configured to perform additional preprocessing of both the received query and the document 115, such as removing stop words, identifying word stems and synonyms, and otherwise preparing the query terms and document content for feature extraction.

A value for at least one feature for each grammatical unit with respect to the query may be extracted, the at least one feature value characterizing a relevance of each grammatical unit to the query (306). For example, the feature extraction module 126 may be configured to analyze each identified sentence or other type of grammatical unit from within the document 115 with respect to the received query. Accordingly, the feature extraction module 126 may determine one or more feature values for various types of features, some of which are described herein in detail. For example, the feature extraction module may extract feature values for semantic similarities between the query and each individual grammatical unit (e.g., sentence), as well as a feature value characterizing a contextual similarity between each sentence the query (e.g., based on one or more preceding or subsequent sentences being similar or relevant to the query).

The grammatical units may then be ranked, based on each feature value of each grammatical unit (308). For example, the ranking module 128 may be configured to rank each grammatical unit with respect to the query, using one or more ranking techniques, some of which are described in detail herein. For example, when the specified grammatical unit is a sentence, the ranking module 128 may rank each query/sentence pair, using the feature values provided by the feature extraction module 126, e.g., using a trained model that is trained using the particular features for which values were obtained.

Finally with respect to FIG. 3, by way of the user interface and in conjunction with the at least one document, at least one selected grammatical unit of the plurality of grammatical units may be displayed, based on the ranking (310). For example, within the document display window 116, contents of the document 115 may be displayed, in whole or in part, with the highest-ranking grammatical unit being visually designated therein. As also described, the various ranked grammatical units may be visually designated within the content of the document 115 simultaneously, whereupon the user may scroll through or otherwise view the document 115 to observe each visually-designated grammatical unit. In such embodiments, relative rankings of the designated grammatical units may be provided in conjunction with each one, as illustrated and described above with respect to the ranking identifiers 209, 211 of FIG. 2. As also described herein, the visually-designated grammatical units may be displayed and designated within the content of the document 115 successively in response to a user action (such as a click of a mouse, or a press of a space bar or enter key), and in order of ranking, and independently of an order of appearance within the content of the document 115. In this way, the user may quickly and efficiently find the most highly-ranked instance of the type of grammatical unit desired.

Figure 4:
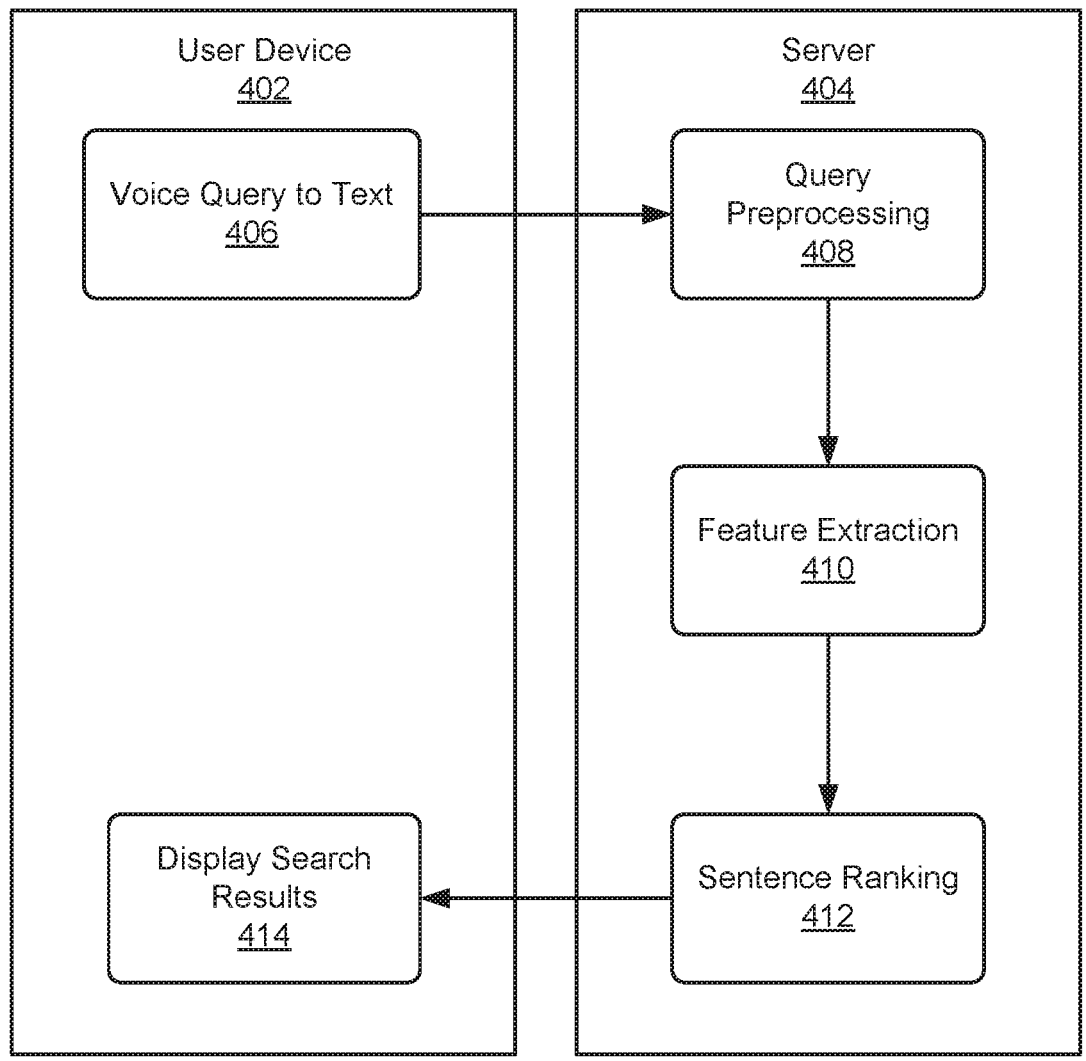
FIG. 4 is a block diagram and associated operational flow of a more detailed example implementation of the system of FIG. 1.

FIG. 4 is a block diagram and associated operational flow of a more detailed example implementation of the system of FIG. 1. An example workflow of an implementation with a voice-search interface is described in conjunction with FIG. 4. In the example of FIG. 4, a user device 402 communicates with a server 404.

In FIG. 4, and as described above, an interface at the user device 402 may be configured to receive, as input a user voice query and a single document. Specifically, the user provides a voice-based query to the interface, which is subsequently converted to a text query (406).

The text query and the document are then sent to the server 404 for pre-processing (408). In the example of FIG. 4, as referenced above and described in more detail below, the pre-processing on the document may be the same as that on the query.

Further in FIG. 4, features are extracted for every query-sentence pair in the document (410), which are then sent to a pre-trained model, in order to rank the sentences in terms of relevance to the query. The trained model then returns a ranking score for each pair (412). Using these ranking scores, the most relevant sentence(s) are returned to the user and displayed (414).

Detailed explanation of example implementations of each of the operations 406-414 is provided below. Specifically, in operation 406, the search query provided by the user for a given document is received as input, and the voice search query is then transcribed to query text, using an appropriate voice-to-text or speech API, as in FIG. 1. Then, in the example, the query text is sent to the server 404, e.g., along with the document. In cases where the document is stored, or remotely accessible, using the server 404, a document identifier (ID) to use in retrieving and accessing the document.

For the preprocessing operation (412), the query, after being transcribed to text, is sent to the server 404. As described, in some implementations, the associated document(s) may be sent to the server 404 with the query, and may be pre-processed together with the query. In other implementations, the document may already be stored at, or available to, the server 404, and the query may be sent with a document identifier to identify the document. Accordingly, the described preprocessing may be performed on the document prior to the query being received.

At the server 404, a tokenizer may be used to separate all the terms in the query (and document, if necessary) as tokens. For example, terms or strings may be classified as words or punctuation, and as specific types of words (e.g., noun, verb, or adjective). The classified punctuation may be used to categorize grammatical units, such as phrases, clauses, or sentences.

Then, a co-reference resolution may be used to resolve any included pronouns, e.g., by associating each pronoun with its antecedent basis. Stop words (e.g., common words such as "the", "to", etc.) may then be removed. Further, stemming or lemmatization techniques may be performed to reduce the tokens to their base forms.

Feature extraction (410) may then be performed on the preprocessed query and document. In the example of FIG. 4, the following described features may be calculated for each sentence in the document, with respect to the received query.

First, a language model score may be calculated, to characterize word occurrence within the document's sentences relative to the query. In general, a language model characterizes a desired probability distribution for each sentence. For example, a query likelihood model may be used to calculate this type of feature. In such examples, a language model is constructed for each sentence in the document. The sentence language model may be smoothed to adjust the estimation results for data sparseness that may occur when analyzing individual sentences from a single document, e.g., using Dirichlet smoothing.

Each sentence may then be ranked, based on a probability of relevance of each sentence, given the current query. In other words, ranking for this feature may be interpreted as the likelihood of a sentence being relevant to a given query, and may be calculated as shown in Equation 1:

$$f_{LM}(Q, S) = \sum_{w \in Q} tf_{w,Q} \log \frac{tf_{w,S} + \mu P(w|C)}{|S| + \mu} \quad \text{Equation 1}$$

In Equation 1, $tf_{w,Q}$ is the number of times that a word w occurs in the query Q, $tf_{w,S}$ is the number of times that w occurs in the sentence S, |S| is the length of the sentence, and P(w|C) is the background language model, calculated as the probability of word w occurring in the document C. $\mu$ is a parameter for Dirichlet smoothing.

In a second example feature, a semantic similarity may be calculated. For example, Word2Vec refers to a group of related models used to produce word embeddings, where word embeddings refer to continuous vector representations of words learned from large amounts of text data, using neural networks. In this context, a vector representation of a word refers to the idea that a given amount of text data (e.g., a document, or corpus of documents) has a number of dimensions or elements determined by a user in the context of training the neural network(s). Then, each vector can be constructed as a distributed representation of each word. In this way, words can be represented in a numerical form, as vectors that are more easily examined and processed to determine similarities therebetween. In other words, vectors of similar words will occur near to one another (i.e., grouped) within the defined vectorspace, so that the similarities may be detected mathematically.

Using these or similar techniques, words with similar meanings occur in close distances within the vector space defined by the vectors. In operation of the system of FIGS. 1 and 4, a pretrained model may be used to generate vector representations of the query and each sentence. Then, a similarity feature value for a query-sentence pair may be calculated as, e.g., an average pairwise cosine similarity between each query-word vector and sentence-word vector, or using any other appropriate or suitable similarity measure between the defined vectors. By calculating feature values in this way, a semantic similarity between the query and each sentence is obtained.

In a final example of sentence features that may be calculated during feature extraction (410), context features include features specific to the context of a given candidate sentence. For example, for a particular sentence, a preceding sentence and/or a subsequent sentence may be used as context. More generally, any one or more adjacent sentence may be used, such as sentences within a same paragraph as a selected sentence. In these implementations, it is assumed that, for a particular query, a relevant sentence is more likely to be surrounded by other sentences that are also somewhat relevant with respect to the query.

For example, if the context feature is combined with, or based on, the earlier-described features of Language Model Score (LM) and Semantic (e.g., Word2Vec) Similarity, then these two features may be represented as a set $F_n$ for the $n^{th}$ sentence in the document, i.e. $F_n = \{LM_n, W2V_n\}$. Then, the context features (CF) for the $n^{th}$ sentence may be defined as the set of LM & W2V features for the $n-1^{th}$ and the $n+1^{th}$ sentences respectively, i.e. $CF_n = \{F_{n-1}, F_{n+1}\}$.

For the sentence ranking operation (412), in some implementations, a learning to rank (L2R) method may be used to rank the sentences, based on the feature values. For example, the model known as MART (Multiple Additive Regression Trees), a gradient boosted regression tree model, may be used as the sentence ranking model. The task of the model is to calculate the relevance score for the feature vector generated from the query-sentence pair, and generate a ranked list of sentences in the descending order of relevance score. The model may be trained on the feature set to optimize weights of the model and thereby obtain the best possible ordering of the results.

In general, training a model, as referenced above with respect to the various models used in the context of the example of FIG. 4, involves learning a large number of parameters using training examples. In the context of neural networks, an optimization algorithm iteratively updates the parameters (weights) of a network based on a batch of training examples, such as the selected feature values, to minimize an objective function. The most widely used optimization algorithm is Stochastic Gradient Descent (SGD), although other optimization algorithms like Adagrad, Adadelta, RMSProp and Adam, may also be used.

By way of further background, neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. The mapping occurs via the function. Thus the weights are weights for the mapping function of the neural network. Each neural network is trained for a specific task, e.g., prediction, classification, encoding, etc. The task performed by the neural network is determined by the inputs provided, the mapping function, and the desired output.

Training can either be supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task it was trained for, such as those referenced herein.

In an even more specific example implementation of the system of FIGS. 1 and 4, the system may be implemented using an Android application that provides a voice-based search interface on text documents. In the application, the user may open and view text documents, which are also present at the server, and can give voice search queries to the application to find relevant search results.

In these and similar implementations, the voice query to text may be executed using available speech API(s) to convert voice query to text. This text query is then sent to server along with the ID of the document that is opened in the application.

The preprocessing may be executed using coreference resolution based on the known Stanford Core NLP library, while stemming may be carried out using known stemming techniques.

Features may be extracted for each preprocessed sentence corresponding to the query, where the described language model score feature may be calculated using the query likelihood model referenced above, smoothed using suitably-parameterized Dirichlet smoothing (e.g., with parameter value $\mu=10$). Word2Vec (semantic) similarity may be calculated using a pretrained model of Word2Vec that is trained on part of a large news dataset, where the model contains, e.g., 300-dimensional vectors for 3 million words and phrases.

The trained model, used for ranking the sentences based on the extracted features, may be trained using the Web Answer Passages dataset (WebAP), so the pre-existing labels may be used to train the model by feeding the processed label values into the learning to rank algorithm. For example, if a perfect label is valued 4, fair label is valued 1 and non-relevant match is valued 0, then $2^x-1$ may be used as the input to the L2R algorithm, where x is the label value.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product for searching within at least one document, the computer program product being tangibly embodied on a non-transitory computer-readable storage medium and comprising instructions that, when executed by at least one computing device, are configured to cause the at least one computing device to:

receive a query, by way of a user interface of an application, in conjunction with identification of the at least one document, the at least one document stored using a computer memory;

identify a plurality of grammatical units within the at least one document;

extract a value for at least one feature for each grammatical unit with respect to the query, the at least one feature value characterizing a relevance of each grammatical unit to the query;

rank the grammatical units, based on each feature value of each grammatical unit;

display the at least one document within the user interface;

visually designate the ranked grammatical units within the at least one document, including an individual, relative ranking of each of the ranked grammatical units; and navigate within the display of the at least one document to display the ranked grammatical units in ranked order, including the individual, relative ranking of the ranked grammatical units.

2. The computer program product of claim 1, wherein the instructions, when executed, are further configured to cause the at least one computing device to:

receive the query as spoken by a user;

convert the spoken query into query text; and display the query text using the user interface.

3. The computer program product of claim 1, wherein the at least one grammatical unit includes at least one of a phrase, a clause, a sentence, and a paragraph.

4. The computer program product of claim 1, wherein a type of the at least one grammatical unit is received in conjunction with receipt of the query.

5. The computer program product of claim 1, wherein the instructions, when executed, are further configured to cause the at least one computing device to extract the value for the at least one feature including:

calculating a language model for each grammatical unit characterizing a relevance of each grammatical unit to the query, based on word occurrence of each word in the grammatical unit and in the query.

6. The computer program product of claim 1, wherein the instructions, when executed, are further configured to cause the at least one computing device to extract the value for the at least one feature including:

calculating a semantic similarity between the query and each grammatical unit, based on at least one similarity measure between vector representations of each word within the query and the grammatical unit.

7. The computer program product of claim 1, wherein the instructions, when executed, are further configured to cause the at least one computing device to extract the value for the at least one feature including:

calculating a context similarity between the query and each grammatical unit, based on a relevance score of at least one adjacent grammatical unit.

8. The computer program product of claim 1, wherein the instructions, when executed, are further configured to cause the at least one computing device to:

rank the grammatical units using a trained model in which the at least one feature is used to train the model and optimize weights of the model to be used during the ranking.

9. The computer program product of claim 1, wherein the individual, relative ranking is provided as a visual designation that includes a ranking identifier displayed adjacent to a corresponding, ranked grammatical unit.

10. The computer program product of claim 9, wherein the navigating includes successively highlighting individual grammatical units within the at least one document in response to corresponding user inputs, and in an order of the individual, relative ranking.

11. A computer-implemented method for searching within at least one document, the method comprising:

receiving a query, by way of a user interface of an application, in conjunction with identification of the at least one document, the at least one document stored using a computer memory;

identifying a plurality of grammatical units within the at least one document;

extracting a value for at least one feature for each grammatical unit with respect to the query, the at least one feature value characterizing a relevance of each grammatical unit to the query;

ranking the grammatical units, based on each feature value of each grammatical unit;

displaying the at least one document within the user interface;

visually designating the ranked grammatical units within the at least one document, including an individual, relative ranking of each of the ranked grammatical units; and navigating within the display of the at least one document to display the ranked grammatical units in ranked order, including the individual, relative ranking of the ranked grammatical units.

12. The computer-implemented method as in claim 11, wherein the at least one grammatical unit includes at least one of a phrase, a clause, a sentence, and a paragraph.

13. The computer-implemented method as in claim 11, further comprising extracting the value for the at least one feature including:

calculating a language model for each grammatical unit characterizing a relevance of each grammatical unit to the query, based on word occurrence of each word in the grammatical unit and in the query.

14. The computer-implemented method as in claim 11, further comprising extracting the value for the at least one feature including:

calculating a semantic similarity between the query and each grammatical unit, based on at least one similarity measure between vector representations of each word within the query and the grammatical unit.

15. The computer-implemented method as in claim 11, further comprising extracting the value for the at least one feature including:

calculating a context similarity between the query and each grammatical unit, based on a relevance score of at least one adjacent grammatical unit.

16. The computer-implemented method as in claim 11, further comprising:

ranking the grammatical units using a trained model in which the at least one feature is used to train the model and optimize weights of the model to be used during the ranking.

17. A system comprising:

at least one memory including instructions; and at least one processor that is operably coupled to the at least one memory and that is arranged and configured to execute instructions that, when executed, cause the at least one processor to receive a query with respect to at least one document;

identify sentences within the at least one document;

extract a plurality of features characterizing a relevance of each sentence of the sentences to the query;

rank the sentences based on the features;

display the at least one document within a user interface;

visually designate the ranked sentences within the at least one document, including an individual, relative ranking of each of the ranked grammatical sentences; and navigate within the display of the at least one document to display the ranked sentences in ranked order, including the individual, relative ranking of the ranked sentences.

18. The system of claim 17, wherein the navigating includes successively displaying document portions and highlighting individual sentences included therein, in response to corresponding user inputs, and in the order of the ranking.

\* \* \* \* \*